US012728814B2

(12) United States Patent
Kim et al.

(10) Patent No.: US 12,728,814 B2
(45) Date of Patent: Sep. 8, 2026

(54) VEHICLE CURTAIN AIRBAG APPARATUS

(71) Applicant: HYUNDAI MOBIS CO., LTD., Seoul (KR)

(72) Inventors: Ju Kyung Kim, Yongin-si (KR); Byeong Mann Ko, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 19/256,613

(22) Filed: Jul. 1, 2025

(65) Prior Publication Data

US 2026/0125025 A1 May 7, 2026

(30) Foreign Application Priority Data

Nov. 6, 2024 (KR) ........................ 10-2024-0156100

(51) Int. Cl.
*B60R 21/2338* (2011.01)
*B60R 21/232* (2011.01)
*B60R 21/237* (2006.01)

(52) U.S. Cl.
CPC ........ *B60R 21/2338* (2013.01); *B60R 21/232* (2013.01); *B60R 21/237* (2013.01)

(58) Field of Classification Search
CPC .. B60R 21/2338; B60R 21/232; B60R 21/237
See application file for complete search history.

(56) References Cited

U.S. PATENT DOCUMENTS 7,077,425 B2 * 7/2006 Ogawa .................. B60R 21/213 280/730.2
7,168,735 B2 * 1/2007 Kino ..................... B60R 21/232 280/730.2
7,571,930 B2 * 8/2009 Osterhout ............ B60R 21/233 280/730.2
7,628,421 B2 * 12/2009 Wright ................ B60R 21/2338 280/730.2
8,282,124 B2 * 10/2012 Trovato ................ B60R 21/232 280/730.2
8,376,397 B2 * 2/2013 Yamamura ............ B60R 21/237 280/730.2
8,636,301 B1 * 1/2014 Wang .................... B60R 21/232 280/730.2
9,266,494 B2 * 2/2016 Wang .................. B60R 21/2338
9,776,593 B2 * 10/2017 Je ........................ B60R 21/2338
10,493,943 B2 * 12/2019 Sugimori ............ B60R 21/2338
10,661,744 B2 * 5/2020 Okuhara ................. B60R 21/26
10,836,342 B2 * 11/2020 Hayashi ................ B60R 21/213
11,370,383 B2 * 6/2022 Jinnai ................... B60R 21/232
12,162,423 B2 * 12/2024 Fecteau ................. B60R 21/235
(Continued)

FOREIGN PATENT DOCUMENTS

CN 112660062 A * 4/2021 ........... B60R 21/237

*Primary Examiner* — Jason D Shanske
*Assistant Examiner* — Shams Dhanani
(74) *Attorney, Agent, or Firm* — NSIP Law

(57) ABSTRACT

A vehicle curtain airbag apparatus includes an airbag cushion disposed on a side portion of a vehicle and including an active area inflated by gas and a plurality of inactive areas into which the gas is not introduced and a control tether to assist deployment of the airbag cushion. The control tether connects the plurality of inactive areas of the airbag cushion in a state in which a portion of the airbag cushion is folded.

8 Claims, 6 Drawing Sheets

160: 162, 164, 166, 168

(56) References Cited

U.S. PATENT DOCUMENTS

2003/0011175 A1* 1/2003 Hess ................... B60R 21/2338 280/730.2
2009/0058049 A1* 3/2009 Villarreal ............ B60R 21/2338 280/730.2
2010/0013203 A1* 1/2010 Mitchell ............. B60R 21/2338 280/743.2
2012/0056409 A1* 3/2012 Jun ....................... B60R 21/237 280/728.1
2012/0286499 A1* 11/2012 Wiik ................... B60R 21/2334 280/730.2
2014/0217709 A1* 8/2014 Fukawatase .......... B60R 21/232 280/730.2
2014/0353949 A1* 12/2014 Sugimori ............ B60R 21/2338 280/728.2
2015/0210242 A1* 7/2015 Kashio .............. B60R 21/23138 280/730.2
2016/0107602 A1* 4/2016 Nakashima ........... B60R 21/233 280/729
2016/0114754 A1* 4/2016 Kawamura ........... B60R 21/232 280/728.2
2016/0185314 A1* 6/2016 Kawamura ........... B60R 21/232 280/728.2
2016/0250989 A1* 9/2016 Morrell ................. B60R 21/232 280/728.2
2017/0151924 A1* 6/2017 Ikenohata ............. B60R 21/235
2017/0182967 A1* 6/2017 Suzuki .................. B60R 21/213
2017/0240131 A1* 8/2017 Low .................... B60R 21/2334
2017/0253211 A1* 9/2017 Choi ..................... B60R 21/213
2017/0355343 A1* 12/2017 Oh ........................ B60R 21/232
2018/0015901 A1* 1/2018 Konaka ................. B60R 21/237
2018/0126944 A1* 5/2018 Choi ..................... B60R 21/233
2018/0162314 A1* 6/2018 Lee ....................... B60R 21/233
2019/0092266 A1* 3/2019 Nonoyama ........... B60R 21/233
2020/0172042 A1* 6/2020 Deng .................... B60R 21/232
2020/0216010 A1* 7/2020 Huelke ................. B60R 21/237
2021/0086718 A1* 3/2021 Wang .................... B60R 21/232
2021/0146872 A1* 5/2021 Paddock ............... B60R 21/213
2023/0182674 A1* 6/2023 Farooq .................. B60R 21/214 280/730.2
2023/0271585 A1* 8/2023 Moon ................. B60R 21/2346
2024/0140347 A1* 5/2024 Kim ...................... B60R 21/232
2024/0416861 A1* 12/2024 Jaradi .................. B60R 21/232

* cited by examiner

FIG. 2

VEHICLE CURTAIN AIRBAG APPARATUS

CROSS REFERENCE TO RELATED APPLICATION

This application claims priority to and the benefit of Korean Patent Application No. 10-2024-0156100, filed on Nov. 6, 2024, the disclosure of which is incorporated herein by reference in its entirety.

BACKGROUND

1. Field of the Invention

The present invention relates to a vehicle curtain airbag apparatus.

2. Description of Related Art

In general, various types of airbag devices for protecting passengers when collision accidents occur are provided in vehicles. Among them, a curtain airbag apparatus is an apparatus which is mounted on a plurality of pillars disposed on each of side portions of front doors and rear doors and of which an airbag cushion is unfolded downward and deployed to protect a passenger in an event of vehicle rollover and side collision. A curtain airbag apparatus may include an airbag cushion deployed in a passenger room and an inflator which generates gas and discharges the gas into the airbag cushion.

Among them, since the airbag cushion covers an entire side portion of the passenger room, the airbag cushion may have a rectangular shape in which the airbag cushion elongates in a longitudinal direction (a direction from the passenger room toward an engine room, or a direction opposite thereto) of a vehicle, gas is injected into the airbag cushion by the inflator, and an entire inner portion of the airbag cushion may be inflated.

Recently, as a vehicle becomes larger, a length of an airbag cushion increases. For example, in a vehicle for accommodating multiple passengers (for example, a vehicle for six or more passengers), a first row area in which a driver's seat and a passenger seat are disposed, and a second row area and a third row area disposed behind the first row area may be provided. Accordingly, the airbag cushion has the length for covering a side portion of the third row area.

In addition, in a vehicle, there are trims which cover pillars constituting a frame of the vehicle. The trims may include a front pillar trim disposed in the first row area, a center pillar trim disposed in the second row area, and a rear pillar trim disposed in the third row area. Each of the trims has a shape protruding toward an inner portion of the passenger room in a width direction (a direction from the driver's seat toward the passenger seat or a direction opposite thereto) intersecting the longitudinal direction.

Such a trim may cause a problem of interfering with deployment when the airbag cushion deploys. For example, the airbag cushion has a first chamber, a second chamber, and a third chamber for covering the first row area, the second row area, and the third row area of the vehicle, and the first chamber, the second chamber, and the third chamber are sequentially disposed in the longitudinal direction (the direction from the engine room toward the passenger room). In this case, in order for the airbag cushion to be stored in the vehicle, the third chamber is primarily folded toward the second chamber, and the primarily folded airbag cushion is rolled and secondarily folded in a direction intersecting a direction in which the third chamber is primarily folded.

Accordingly, when the conventional airbag cushion having the above-described structure is unfolded to be deployed, two unfolding processes are performed. More specifically, a first unfolding process of unfolding the airbag cushion by rolling a third chamber in a direction from a ceiling surface toward a bottom surface of a passenger room and a second unfolding process of unfolding the airbag cushion by rolling the third chamber after the first unfolding process is completed are performed.

Accordingly, the third chamber which is deployed later than the other chambers may come into contact with a side portion of a rear pillar trim when rolled to release a folded state. This may cause delayed deployment of the third chamber, and thus a problem that the third chamber does not deploy within a time range intended in a design process can occur.

Accordingly, in order to quickly form a shape for protecting a passenger sitting in a third row area, there is a growing need for research to prevent delayed deployment of an airbag cushion.

SUMMARY

The present invention is directed to providing a vehicle curtain airbag apparatus that is improved to prevent delayed deployment of an airbag cushion in order to quickly form a shape for protecting a passenger sitting in a third row area.

According to an aspect of the present invention, a vehicle curtain airbag apparatus includes an airbag cushion disposed on a side portion of a vehicle and including an active area configured to be inflated by gas and a plurality of inactive areas into which the gas is not introduced and a control tether configured to assist deployment of the airbag cushion, and the control tether connects the plurality of inactive areas of the airbag cushion in a state in which a portion of the airbag cushion is folded.

The airbag cushion may include a first main body forming an exterior thereof, the first main body may include a first panel configured to come into contact with a passenger and a second panel coupled to the first panel and configured not to contact the passenger, and the control tether may be disposed on the second panel of the first main body of the airbag cushion.

The airbag cushion may include a first bonding portion disposed along an edge of the first main body and forming the active area in the first main body, and the control tether may be disposed outside the first bonding portion before the airbag cushion is folded.

The control tether may include a second main body forming an exterior thereof, the airbag cushion may include a plurality of second bonding portions disposed inside the first bonding portion and forming the plurality of inactive areas inside the first bonding portion, and the second main body of the control tether may be fixed to one of the plurality of second bonding portions of the airbag cushion in a state in which the portion of the airbag cushion is folded.

The control tether may include a slit formed in the second main body and configured to assist rupture of the second main body while the airbag cushion deploys to unfold the folded portion of the airbag cushion.

A first end portion of the second main body of the control tether may be fixed to an outer side of the first bonding portion of the airbag cushion, and the slit of the control tether may be disposed proximate to the first end portion of the second main body.

A second end portion of the second main body of the control tether may be coupled to one of the plurality of second bonding portions of the airbag cushion in the state in which the portion of the airbag cushion is folded.

In addition, according to another aspect of the present invention, a vehicle curtain airbag apparatus includes an airbag cushion disposed on a side portion of a vehicle and folded through a first folding process of folding one portion of the airbag cushion with respect to a first direction as a center and a second folding process of rolling the airbag cushion with respect to a second direction as an axis direction after the first folding process and a control tether coupled to the airbag cushion, and the airbag cushion includes an active area configured to be inflated by gas and a plurality of inactive areas into which the gas is not introduced, and the control tether is fixed to one of the plurality of inactive areas of the airbag cushion after the first folding process of the airbag cushion is completed.

The airbag cushion may include a first main body forming an exterior thereof, the first main body may include a first panel configured to come into contact with a passenger and a second panel coupled to the first panel and configured not to contact the passenger, and the control tether may be disposed on the second panel of the first main body of the airbag cushion.

The airbag cushion may deploy through a first unfolding process of releasing a rolled state through the second folding process and a second unfolding process of releasing a folded state through the first folding process after the first unfolding process is completed, and the control tether may be ruptured while the second unfolding process of the airbag cushion is performed.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which:

FIG. 2 is a view illustrating a control tether;

DETAILED DESCRIPTION

Figure 1:
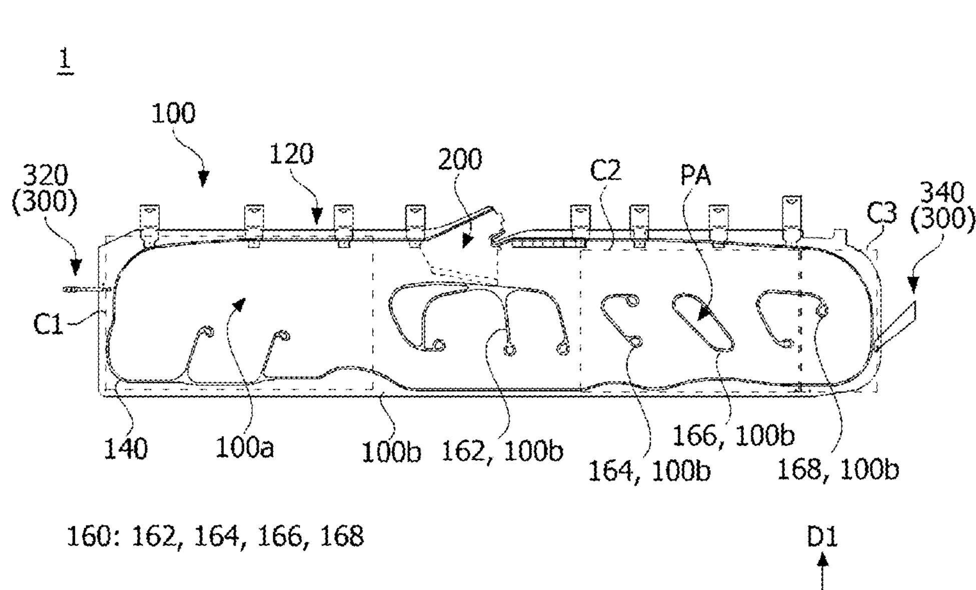
FIG. 1 is a view illustrating a vehicle curtain airbag apparatus according to one embodiment of the present invention.

Since the present invention allows various changes and has many embodiments, specific embodiments will be illustrated in the accompanying drawings and described. However, this is not intended to limit the present invention to the specific embodiments, and it is to be appreciated that all changes, equivalents, and substitutes that fall within the spirit and technical scope of the present invention are encompassed in the present invention.

Although the terms "first," "second," and the like may be used to describe various elements, these elements should not be limited by these terms. These terms are only used to distinguish one element from another element. For example, a second element could be termed a first element, and a first element could similarly be termed a second element without departing from the scope of the present invention. The term "and/or" includes any one or any combination of a plurality of associated listed items.

When a first element is referred to as being "connected" or "coupled" to a second element, it will be understood that the first element may be directly connected or coupled to the second element, or a third element may be present therebetween. In contrast, when an element is referred to as being "directly connected" or "directly coupled" to another element, it will be understood that there are no intervening elements.

In a description of the embodiment, in a case in which any one element is described as being formed on or under another element, such a description includes both a case in which the two elements are formed in direct contact with each other and a case in which the two elements are formed in indirect contact with each other with one or more other elements interposed between the two elements. In addition, when one element is described as being formed on or under the other element, such a description may include a case in which the one element is formed at an upper side or a lower side with respect to the other element.

Terminology used herein is to describe particular embodiments only and is not intended to limit the present invention. The singular forms are intended to include the plural forms unless the context clearly indicates otherwise. In the present specification, it should be further understood that the terms "comprise," "comprising," "include," and/or "including" used herein specify the presence of stated features, numbers, steps, operations, components, parts, or combinations thereof but do not preclude the presence or addition of one or more other features, numbers, steps, operations, components, parts or combinations thereof.

Unless otherwise defined, all terms including technical and scientific terms used herein have meanings which are the same as meanings generally understood by those skilled in the art. Terms, such as those defined in commonly used dictionaries, should be interpreted as having meanings that are consistent with their meanings in the context of the relevant art and will not be interpreted in an idealized or overly formal sense unless expressly so defined herein.

Hereinafter, when a vehicle curtain airbag apparatus is described in detail with reference to the accompanying drawings, components that are the same or correspond to each other will be denoted by the same reference numerals in all drawings, and redundant descriptions will be omitted.

Figure 2:
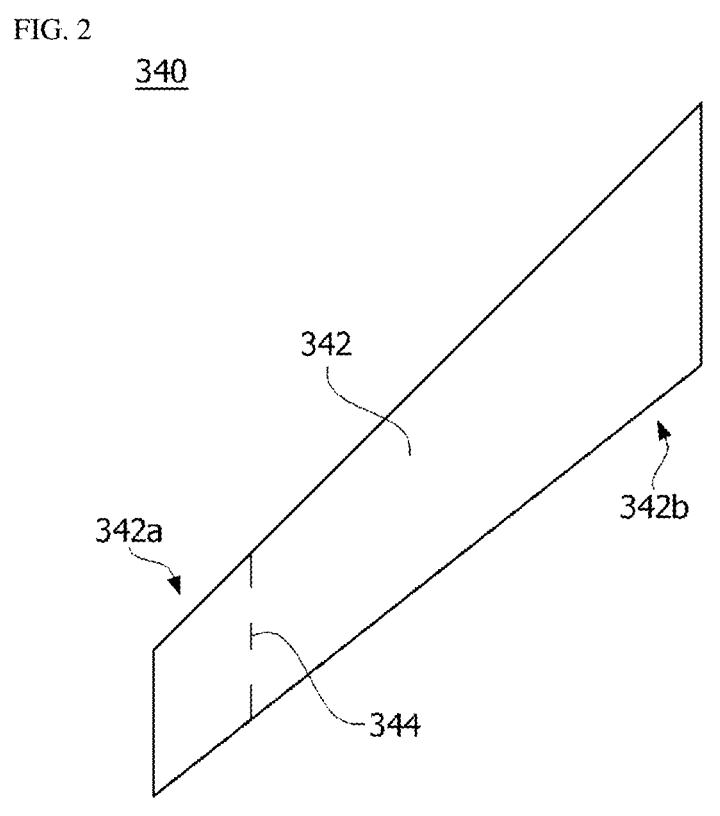
Figure 3:
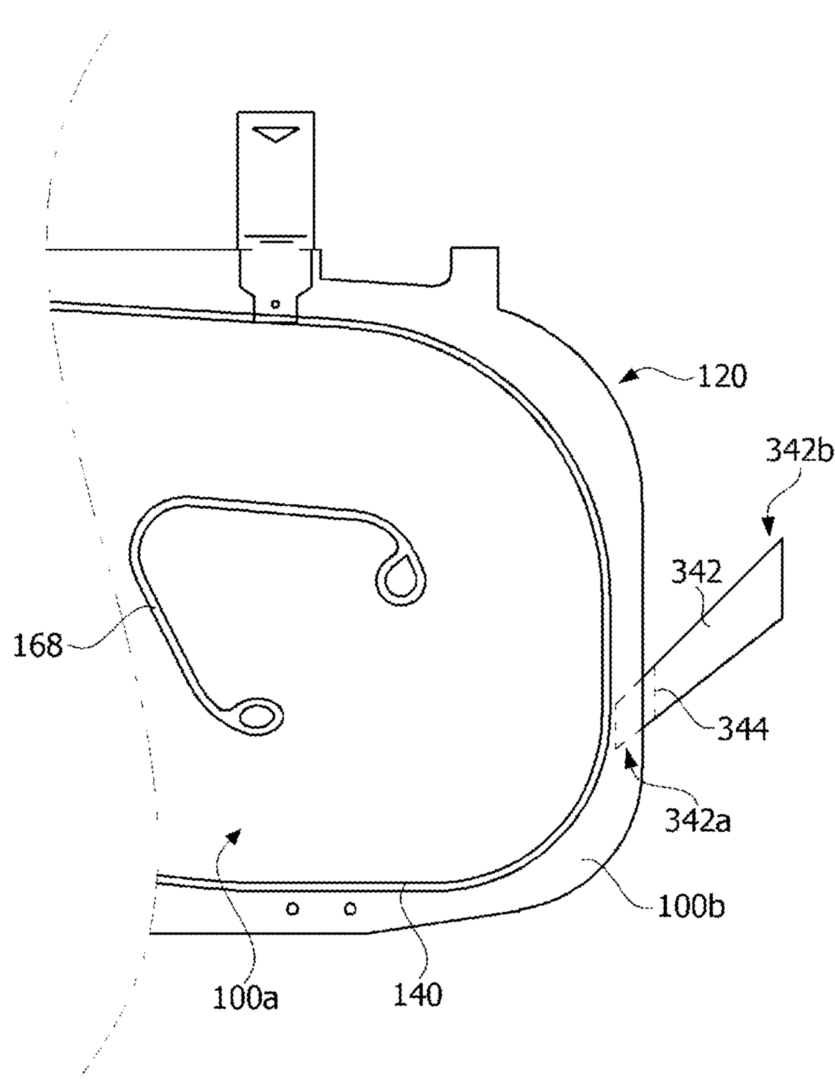
FIG. 3 is a front view illustrating the control tether coupled to an airbag cushion.
Figure 4:
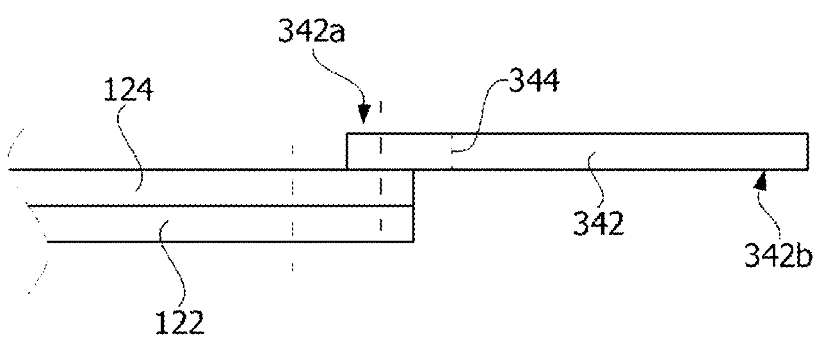
FIG. 4 is a plan view illustrating the control tether coupled to the airbag cushion.
Figure 5:
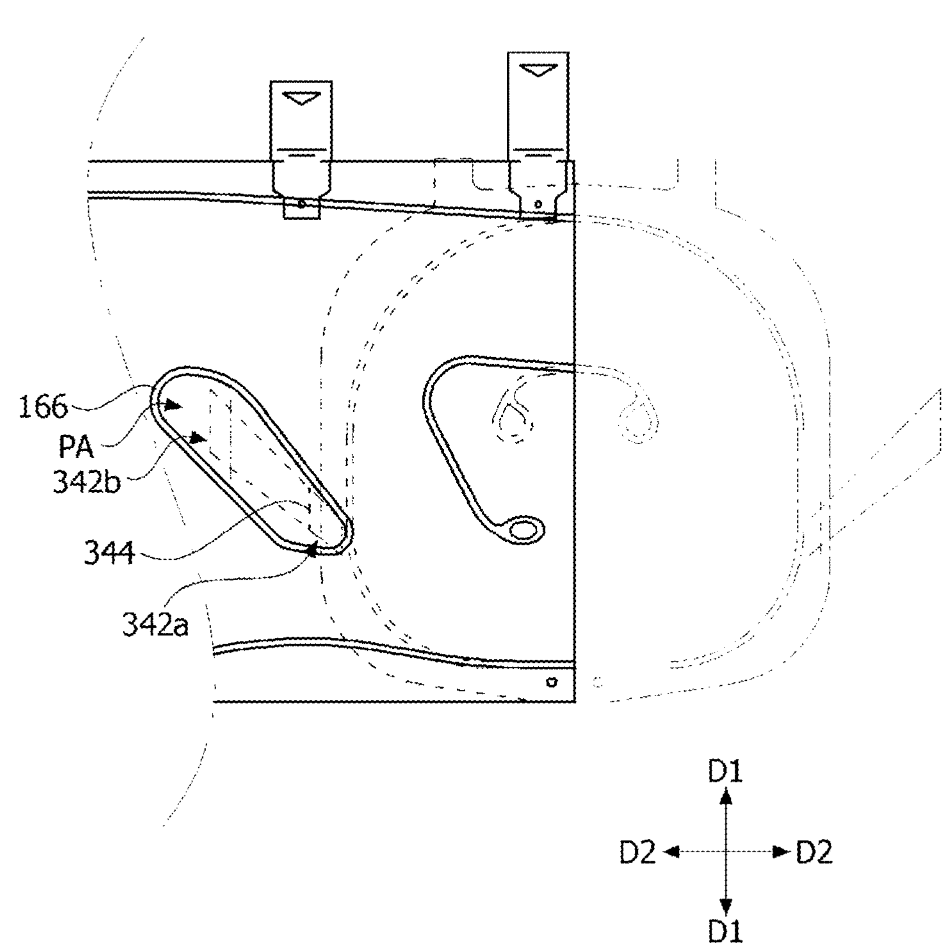
FIG. 5 is a front view illustrating a portion of the airbag cushion which is folded.
Figure 6:
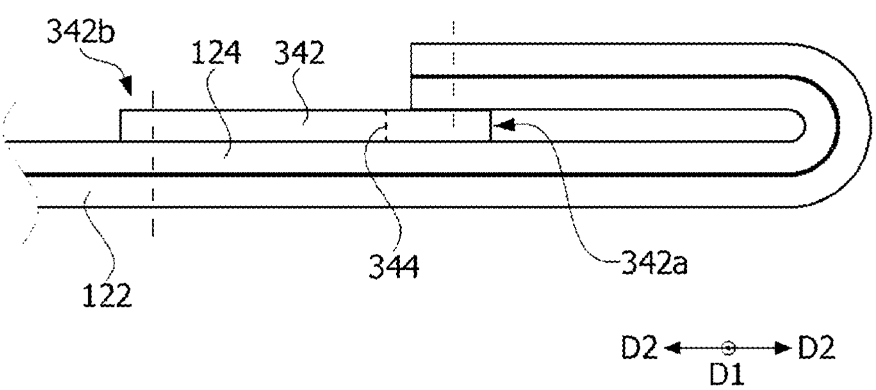
FIG. 6 is a plan view illustrating the portion of the airbag cushion which is folded.

FIG. 1 is a view illustrating a vehicle curtain airbag apparatus according to one embodiment of the present invention, and FIG. 2 is a view illustrating a control tether. FIG. 3 is a front view illustrating the control tether coupled to an airbag cushion, and FIG. 4 is a plan view illustrating the control tether coupled to the airbag cushion. FIG. 5 is a front view illustrating a portion of the airbag cushion which is folded, and FIG. 6 is a plan view illustrating the portion of the airbag cushion which is folded.

First, a first direction D1 to be described in the present embodiment is a height direction, and the height direction may be a direction from a ceiling surface toward a bottom surface of a passenger room of a vehicle. In addition, a second direction D2 to be described in the present embodiment is a longitudinal direction, and the longitudinal direction may be a direction from the passenger room (not shown) toward an engine room (not shown) of the vehicle or a direction opposite thereto and may be a direction intersecting the first direction D1.

Referring to FIG. 1, a vehicle curtain airbag apparatus 1 according to one embodiment of the present invention may be installed in the passenger room of the vehicle. More specifically, the vehicle curtain airbag apparatus 1 may be disposed on the ceiling surface of the passenger room. The vehicle curtain airbag apparatus 1 may include an airbag cushion 100, a diffuser 200, and a tether unit 300.

The airbag cushion 100 may be installed on a side portion of the vehicle. The airbag cushion 100 may include a main body 120 and a bonding unit.

The main body 120 (hereinafter, a first main body 120) may form an exterior of the airbag cushion 100. The first main body 120 may be disposed in the second direction D2. A first panel 122 and a second panel 124, each of which has a rectangular shape in which a length in the second direction D2 is greater than a length in the first direction D1, may be combined to form the first main body 120 (see FIGS. 4 and 6). More specifically, the first panel 122 and the second panel 124 may be coupled to form the first main body 120. Edges of the first panel 122 and the second panel 124 may have the same shape.

In this case, the first panel 122 may be a panel to come into contact with a passenger, and the second panel 124 may be a panel which is coupled to the first panel 122 and does not come into contact with the passenger. Accordingly, when the airbag cushion 100 deploys, the first panel 122 may be disposed at a position facing a seat disposed in the passenger room, and the second panel 124 may be disposed at a position facing a door, door trim, or pillar trim disposed in the passenger room.

In addition, an entrance portion may be formed in the first main body 120. The entrance portion may be a portion formed by opening a portion of the first main body 120 such that the first main body 120 accommodates the diffuser 200 and an inflator (not shown).

The bonding unit may be a set of portions at which the first panel 122 and the second panel 124 are bonded to each other in a state in which the first panel 122 and the second panel 124 of the first main body 120 are disposed to face each other. The bonding unit may include a first bonding portion 140 and a plurality of second bonding portions 160. The bonding unit may be disposed inside an edge of the first main body 120.

The first bonding portion 140 may be disposed along the edge of the first main body 120. Accordingly, the first bonding portion 140 may form an active area 100*a* in the first main body 120. In this case, the active area 100*a* may be a portion inflated by gas when the gas generated by the inflator is introduced into the airbag cushion 100.

The plurality of second bonding portions 160 may be disposed inside the first bonding portion 140. The plurality of second bonding portions 160 may include a 2-1 bonding portion 162, a 2-2 bonding portion 164, a 2-3 bonding portion 166, and a 2-4 bonding portion 168.

The 2-1 bonding portion 162 may be disposed under the diffuser 200 in the first direction D1. The 2-1 bonding portion 162 may be disposed between a first chamber area C1 and a second chamber area C2. In this case, the first chamber area C1 may be an area in the first main body 120 which may come into contact with the body of the passenger sitting in a first row area including a driver's seat and a passenger seat. In this case, the first chamber area C1 may be the area disposed at a left side of the 2-1 bonding portion 162 based on the 2-1 bonding portion 162 in the second direction D2.

The second chamber area C2 in the first main body 120 may be an area which is disposed at a right side of the first row area in the second direction D2 and may come into contact with the body of a passenger sitting in a second row area disposed at the right side of the first row area. That is, the second chamber area C2 may be disposed to be spaced apart from the first chamber area C1 with the 2-1 bonding portion 162 interposed therebetween in the second direction D2.

The 2-2 bonding portion 164 and the 2-3 bonding portion 166 may be disposed in the second chamber area C2. The 2-2 bonding portion 164 and the 2-3 bonding portion 166 may be sequentially disposed at a right side of the 2-1 bonding portion 162 in the second direction D2. The 2-2 bonding portion 164 and the 2-3 bonding portion 166 may be elements forming a shape of the second chamber area C2.

The 2-4 bonding portion 168 may be disposed between the second chamber area C2 and a third chamber area C3. Alternatively, the 2-4 bonding portion 168 may be disposed at a boundary between the second chamber area C2 and the third chamber area C3. The 2-4 bonding portion 168 may be disposed at a right side of the 2-3 bonding portion 166 in the second direction D2. The 2-4 bonding portion 168 may be an element forming a shape of the second chamber area C2 or the third chamber area C3.

The plurality of second bonding portions 160 may form a plurality of inactive areas 100*b* inside the first bonding portion 140. Particularly, an inactive area 100*b* formed in the 2-3 bonding portion 166 may form a placement area PA in the 2-3 bonding portion 166 in which a control tether 340 to be described below may be disposed.

The diffuser 200 may be coupled to the airbag cushion 100 and distribute gas to flow toward the first chamber area C1, the second chamber area C2, and the third chamber area C3 of the airbag cushion 100. The diffuser 200 may be disposed at the entrance portion formed in the first main body 120 of the airbag cushion 100 and may accommodate the inflator therein.

Referring to FIGS. 1 to 4, the tether unit 300 may be disposed on the airbag cushion 100, which is unfolded and deployed by gas discharged from the inflator, for normal deployment of the airbag cushion 100. The tether unit 300 may include a support tether 320 and a control tether 340.

The support tether 320 may be disposed on a left end portion of the first main body 120 of the airbag cushion 100 in the second direction D2. More specifically, the support tether 320 may be disposed outside the first bonding portion 140 formed in the first main body 120 of the airbag cushion 100. The support tether 320 may connect the airbag cushion 100 and a vehicle body to prevent the airbag cushion 100 from escaping from a deployment position when the airbag cushion 100 deploys.

The control tether 340 may be disposed on a right end portion of the first main body 120 of the airbag cushion 100 in the second direction D2. More specifically, the control tether 340 may be disposed outside the first bonding portion 140 formed in the first main body 120 of the airbag cushion 100. The control tether 340 may assist deployment of the airbag cushion 100. The control tether 340 may be disposed outside the first bonding portion 140 before the airbag cushion 100 is folded. The control tether 340 may include a main body 342 and a slit 344.

The main body 342 (hereinafter, a second main body 342) may form an exterior of the control tether 340. One end portion of the second main body 342 may be fixed to an outer side of the first bonding portion 140 of the airbag cushion 100. Accordingly, when the airbag cushion 100 is completely unfolded, the second main body 342 may be disposed to protrude toward the outside of the first main body 120 of the airbag cushion 100. In addition, the control tether 340 may be disposed at a location close to the third chamber area C3 of the airbag cushion 100.

The slit 344 may be formed in the second main body 342. As illustrated in FIGS. 2 and 3, a plurality of slits 344 may be disposed in the second main body 342. In this case, the slit 344 may have a shape of a perforated line. The slit 344 may be disposed near one end portion of the second main body 342. More specifically, the slit 344 may be disposed near a location in the second main body 342 which overlaps an outer portion of the first bonding portion 140 formed in the first main body 120 of the airbag cushion 100. The slit 344 may assist rupture of the second main body 342 while the airbag cushion 100 is deployed and a folded portion of the airbag cushion 100 is unfolded.

FIG. 5 is a front view illustrating a portion of the airbag cushion which is folded, and FIG. 6 is a plan view illustrating the portion of the airbag cushion which is folded.

The control tether 340 may assist deployment of the airbag cushion 100. More specifically, when the airbag cushion 100 is stored before deployment, the airbag cushion 100 may be stored in a folded state. In this case, the airbag cushion 100 may be folded through two folding processes.

Referring to FIGS. 5 and 6, first, the airbag cushion 100 may be primarily folded through a first folding process. More specifically, as a boundary portion between the second chamber area C2 and the third chamber area C3 is folded, the airbag cushion 100 may be primarily folded. In this case, a portion of the first main body 120 of the airbag cushion 100 may be folded with respect to the first direction D1 illustrated in FIGS. 3, 5, and 6. In addition, the portion of the first main body 120 of the airbag cushion 100 may be folded by being rotated toward the second panel 124 with respect to the first direction D1.

In this case, since the airbag cushion 100 is primarily folded as the boundary portion between the second chamber area C2 and the third chamber area C3 is folded, the control tether 340 may move toward the second panel 124 of the airbag cushion 100 along the one portion of the first main body 120 of the airbag cushion 100 folded in the first direction D1.

In addition, the second main body 342 of the control tether 340 may be fixed to any one of the plurality of second bonding portions 160 of the airbag cushion 100 after the one portion of the airbag cushion 100 is folded. More specifically, the other end portion of the second main body 342 of the control tether 340 may be coupled to any one of the plurality of second bonding portions 160 of the airbag cushion 100 when the portion of the airbag cushion 100 is folded. More specifically, the other end portion of the second main body 342 of the control tether 340 may be fixed to the placement area inside the 2-3 bonding portion 166 of the airbag cushion 100.

The control tether 340 may be disposed on the second panel 124 of the first main body 120 of the airbag cushion 100. This is for preventing the folded portion of the airbag cushion 100 from facing the first panel 122 when the airbag cushion 100 deploys to prevent a situation in which a buffering effect of the airbag cushion 100 is reduced by the third chamber area C3 which is folded in an exceptional situation in which a passenger comes into contact with the airbag cushion 100 between first deployment and second deployment of the airbag cushion 100.

In addition, the reason why the control tether 340 is disposed on the second panel 124 of the first main body 120 of the airbag cushion 100 is for preventing a situation in which the head or body of the passenger collides with the third chamber area C3 of the airbag cushion 100 which has been folded toward the first panel 122 and is unfolded while the airbag cushion 100 is secondarily deployed after primary deployment.

As described above, the airbag cushion 100 primarily folded through the first folding process may be completely folded through the second folding process of rolling and folding the airbag cushion 100 with respect to the second direction D2 as an axial direction after the first folding process.

Conversely, the airbag cushion 100 may deploy through two unfolding processes.

First, when gas is discharged from the inflator coupled to the diffuser 200, the gas is distributed through the diffuser 200, and the first main body 120 of the airbag cushion 100 is unfolded in the first direction D1. Accordingly, a first unfolding process is completed. In this case, the portion of the first main body 120 of the airbag cushion 100 is unfolded in a state of being folded by the control tether 340.

After the first unfolding process is completed, the inflator continuously discharges gas. Accordingly, the gas starts to be introduced into the folded portion of the first main body 120 of the airbag cushion 100. Accordingly, the folded portion of the first main body 120 of the airbag cushion 100 inflates to start a second unfolding process.

As described above, the second unfolding process may be a process of unfolding the folded portion of the first main body 120 of the airbag cushion 100, and in this case, a boundary portion of the folded portion in the first main body 120 of the airbag cushion 100 may serve as a rotation axis during a process of inflating the folded portion of the first main body 120 of the airbag cushion 100. Accordingly, the folded portion of the first main body 120 of the airbag cushion 100 rotates with respect to the first direction D1 as an axial direction. In this case, the control tether 340 is ruptured by a force rotating the folded portion in the first main body 120 of the airbag cushion 100.

In this case, the control tether 340 is divided into a plurality of pieces as the slit 344 is ruptured. The slit 344 is disposed close to one end portion of the second main body 342 of the control tether 340. Accordingly, the control tether 340 may be quickly ruptured by a force which rotates one portion of the first main body 120 of the airbag cushion 100 with respect to the first direction D1 as the axial direction (see FIG. 6).

As described above, in the vehicle curtain airbag apparatus 1 according to one embodiment of the present invention, the control tether 340 may connect the plurality of inactive areas 100*b* of the airbag cushion 100 in a state in which a portion of the airbag cushion 100 is folded. Accordingly, the second unfolding process is not performed during the first unfolding process, and thus a phenomenon of delayed deployment caused by the third chamber area C3 of the airbag cushion 100 being blocked by the pillar trim of the vehicle can be prevented.

In addition, in the vehicle curtain airbag apparatus 1 according to one embodiment of the present invention, the control tether 340 may connect the plurality of inactive areas 100*b* of the airbag cushion 100 in a state in which a portion of the airbag cushion 100 is folded. Accordingly, even in a situation in which the inactive areas 100*b* of the airbag cushion 100, to which the control tether 340 is fixed, are damaged while the second unfolding process is performed, a situation of the leakage of gas accommodated in the active area 100*a* of the airbag cushion 100 can be prevented. Accordingly, delayed deployment of the airbag cushion 100 can be prevented.

According to one embodiment of the present invention, in a state in which a portion of an airbag cushion is folded, a control tether can connect a plurality of inactive areas of the airbag cushion. Accordingly, since a second unfolding process is not performed during a first unfolding process, a phenomenon of delayed deployment caused by a third chamber area of the airbag cushion being blocked by a pillar trim of a vehicle can be prevented.

While the present invention has been described above with reference to embodiments of the present invention, it may be understood by those skilled in the art that various modifications and changes of the present invention may be made within a range not departing from the spirit and scope of the present invention defined by the appended claims. In addition, it should be interpreted that differences related to modifications and changes fall within the scope of the present invention defined by the appended claims.

What is claimed is:

1. A vehicle curtain airbag apparatus comprising:

an airbag cushion disposed on a side portion of a vehicle and including an active area configured to be inflated by gas and a plurality of inactive areas into which the gas is not introduced; and a control tether comprising a main body forming an exterior thereof and configured to assist deployment of the airbag cushion, wherein the control tether connects the plurality of inactive areas of the airbag cushion in a state in which a portion of the airbag cushion is folded to form a folded portion, and wherein the control tether includes a slit formed therein and configured to assist rupture of the main body of the control tether while the airbag cushion deploys to unfold the folded portion of the airbag cushion.

2. The vehicle curtain airbag apparatus of claim 1, wherein the airbag cushion includes a main body forming an exterior thereof, wherein the main body of the airbag cushion includes a first panel configured to come into contact with a passenger and a second panel coupled to the first panel and configured not to contact the passenger, and wherein the control tether is disposed on the second panel.

3. The vehicle curtain airbag apparatus of claim 2, wherein the airbag cushion includes a first bonding portion disposed along an edge of the main body of the airbag cushion and forming the active area in the main body of the airbag cushion, and the control tether is disposed outside the first bonding portion before the airbag cushion is folded.

4. The vehicle curtain airbag apparatus of claim 3, wherein the airbag cushion includes a plurality of second bonding portions disposed inside the first bonding portion and forming the plurality of inactive areas inside the first bonding portion, and the main body of the control tether is fixed to one of the plurality of second bonding portions of the airbag cushion in a state in which the portion of the airbag cushion is folded.

5. The vehicle curtain airbag apparatus of claim 3, wherein a first end portion of the main body of the control tether is fixed to an outer side of the first bonding portion of the airbag cushion, and the slit of the control tether is disposed proximate to the first end portion of the main body.

6. The vehicle curtain airbag apparatus of claim 4, wherein a second end portion of the main body of the control tether is coupled to one of the plurality of second bonding portions of the airbag cushion in the state in which the portion of the airbag cushion is folded.

7. A vehicle curtain airbag apparatus comprising:

an airbag cushion disposed on a side portion of a vehicle and folded through a first folding process of folding a portion of the airbag cushion with respect to a first direction as a center and a second folding process of rolling the airbag cushion with respect to a second direction as an axis direction after the first folding process; and a control tether coupled to the airbag cushion, wherein the airbag cushion includes an active area configured to be inflated by gas and a plurality of inactive areas into which the gas is not introduced, wherein the control tether is fixed to one of the plurality of inactive areas of the airbag cushion after the first folding process of the airbag cushion is completed, the airbag cushion is configured to deploy through a first unfolding process of releasing a rolled state through the second folding process and a second unfolding process of releasing a folded state through the first folding process after the first unfolding process is completed, and the control tether is configured to be ruptured while the second unfolding process of the airbag cushion is performed.

8. The vehicle curtain airbag apparatus of claim 7, wherein the airbag cushion includes a first main body forming an exterior thereof, the first main body includes a first panel configured to come into contact with a passenger and a second panel coupled to the first panel and configured not to contact the passenger, and the control tether is disposed on the second panel.

* * * * *